US012322352B2

(12) United States Patent
Mazrouei et al.

(10) Patent No.: US 12,322,352 B2
(45) Date of Patent: Jun. 3, 2025

(54) DISPLAY SYSTEM AND CIRCUIT FOR PERFORMING COLOR CORRECTION ON IMAGE DATA BASED ON ATTENUATION FACTOR DISTRIBUTION OF LIGHT WITH RESPECT TO DISTANCE

(71) Applicant: SEIKO EPSON CORPORATION, Tokyo (JP)

(72) Inventors: Sebdani mahmood Mazrouei, Markham (CA); Kwok lap jimmy Lai, Vancouver (CA); Kumar anandabairavasamy Anand, Richmond (CA)

(73) Assignee: SEIKO EPSON CORPORATION (JP)

( * ) Notice: Subject to any disclaimer, the term of this patent is extended or adjusted under 35 U.S.C. 154(b) by 0 days.

(21) Appl. No.: 18/618,155

(22) Filed: Mar. 27, 2024

(65) Prior Publication Data

US 2024/0331649 A1 Oct. 3, 2024

(30) Foreign Application Priority Data

Mar. 28, 2023 (JP) ................................. 2023-051047

(51) Int. Cl.
*G09G 3/34* (2006.01)

(52) U.S. Cl.
CPC ... *G09G 3/3426* (2013.01); *G09G 2320/0242* (2013.01); *G09G 2320/0626* (2013.01); *G09G 2340/0407* (2013.01); *G09G 2360/16* (2013.01)

(58) Field of Classification Search
CPC ......... G09G 3/3426; G09G 2320/0242; G09G 2320/0626; G09G 2340/0407;

(Continued)

(56) References Cited

U.S. PATENT DOCUMENTS

2013/0314459 A1* 11/2013 Nakanishi ............ G09G 3/3406 345/694
2021/0193066 A1* 6/2021 Anand ................. G09G 3/3648
2021/0311361 A1* 10/2021 Okamoto ................. G09G 5/10

FOREIGN PATENT DOCUMENTS

JP 2019-095559 A 6/2019

* cited by examiner

*Primary Examiner* — Temesghen Ghebretinsae
*Assistant Examiner* — Ivelisse Martinez Quiles
(74) *Attorney, Agent, or Firm* — Harness, Dickey & Pierce, P.L.C.

(57) ABSTRACT

A circuit apparatus includes a storage unit, an illumination luminance calculation circuit, and a color correction circuit. The storage unit stores a look-up table indicating an attenuation factor distribution of light with respect to a distance between a light source element and a pixel. The illumination luminance calculation circuit calculates, based on attenuation factor information output from the look-up table and light source luminance information indicating luminance of light emitted by each light source element, illumination luminance information indicating luminance at which a target pixel of the display panel is illuminated by a plurality of light source elements. The color correction circuit performs color correction on input image data based on the illumination luminance information. The look-up table outputs the attenuation factor information with a first distance resolution in a first distance range and outputs the attenuation factor information with a second distance resolution higher than the first distance resolution in a second distance range in which a slope of the attenuation factor distribution is larger than that in the first distance range.

13 Claims, 12 Drawing Sheets

(58) Field of Classification Search
CPC ................ G09G 2360/16; G09G 3/36; G09G 2320/0285; G09G 2320/0646
See application file for complete search history.

*FIG. 5*

LUT1

| INDEX | DISTANCE |
|---|---|
| 0 | 0 |
| 1 | 1.5 |
| 2 | 3 |
| 3 | 4 |
| 4 | 5 |
| 5 | 6 |
| 6 | 7 |
| 7 | 8 |
| 8 | 9 |
| 9 | 10 |
| 10 | 11 |
| 11 | 12 |
| 12 | 14 |
| 13 | 16 |
| 14 | 18 |
| 15 | 20 |

DRA $\Delta d=1.5$ (distance 0 to 3)

DRB $\Delta d=1$ (distance 3 to 12)

DRC $\Delta d=2$ (distance 12 to 20)

LUT2

| INDEX | ATTENUATION FACTOR |
|---|---|
| 0 | 100.0 |
| 1 | 97.2 |
| 2 | 89.4 |
| 3 | 82.0 |
| 4 | 73.3 |
| 5 | 63.9 |
| 6 | 54.3 |
| 7 | 45.0 |
| 8 | 36.3 |
| 9 | 28.6 |
| 10 | 21.9 |
| 11 | 16.3 |
| 12 | 8.3 |
| 13 | 3.6 |
| 14 | 1.1 |
| 15 | 0.0 |

FIG. 7

LUT1

| INDEX | $(DISTANCE)^2$ |
|---|---|
| 0 | 0 |
| 1 | 2.25 |
| 2 | 9 |
| 3 | 16 |
| 4 | 25 |
| 5 | 36 |
| 6 | 49 |
| 7 | 64 |
| 8 | 81 |
| 9 | 100 |
| 10 | 121 |
| 11 | 144 |
| 12 | 196 |
| 13 | 256 |
| 14 | 324 |
| 15 | 400 |

LUT2

| INDEX | ATTENUATION FACTOR |
|---|---|
| 0 | 100.0 |
| 1 | 97.2 |
| 2 | 89.4 |
| 3 | 82.0 |
| 4 | 73.3 |
| 5 | 63.9 |
| 6 | 54.3 |
| 7 | 45.0 |
| 8 | 36.3 |
| 9 | 28.6 |
| 10 | 21.9 |
| 11 | 16.3 |
| 12 | 8.3 |
| 13 | 3.6 |
| 14 | 1.1 |
| 15 | 0.0 |

*FIG. 8*

LUT1

| INDEX | DISTANCE |
|---|---|
| 0 | 0 |
| 1 | 2 |
| 2 | 4 |
| 3 | 6 |
| 4 | 8 |
| 5 | 9 |
| 6 | 10 |
| 7 | 11 |
| 8 | 12 |
| 9 | 13 |
| 10 | 14 |
| 11 | 15 |
| 12 | 16 |
| 13 | 17 |
| 14 | 18.5 |
| 15 | 20 |

DRA Δd=2 (distance 0 to 8)

DRB Δd=1 (distance 8 to 17)

DRC Δd=1.5 (distance 17 to 20)

LUT2

| INDEX | ATTENUATION FACTOR |
|---|---|
| 0 | 100.0 |
| 1 | 98.9 |
| 2 | 96.4 |
| 3 | 91.7 |
| 4 | 83.7 |
| 5 | 78.1 |
| 6 | 71.4 |
| 7 | 63.7 |
| 8 | 55.0 |
| 9 | 45.7 |
| 10 | 36.1 |
| 11 | 26.7 |
| 12 | 18.0 |
| 13 | 10.6 |
| 14 | 2.8 |
| 15 | 0.0 |

FIG. 10

| | | DRAx | | DRBx | | | | | | | | DRCx | | | |
|---|---|---|---|---|---|---|---|---|---|---|---|---|---|---|---|
| | | x DISTANCE | | | | | | | | | | | | | |
| | | 0 | 1.5 | 3 | 4 | 5 | 6 | 7 | 8 | 9 | 10 | 11 | 14 | 17 | 20 |
| DRAy | y DISTANCE | 0 | 100.0 | 97.3 | 89.5 | 82.1 | 73.4 | 64.1 | 54.6 | 45.4 | 36.8 | 29.1 | 22.5 | 8.9 | 2.8 | 0.7 |
| DRAy | | 1.5 | 97.3 | 94.6 | 87.0 | 79.8 | 71.4 | 62.4 | 53.1 | 44.1 | 35.8 | 28.3 | 21.8 | 8.7 | 2.7 | 0.7 |
| DRBy | | 3 | 89.5 | 87.0 | 80.1 | 73.4 | 65.7 | 57.4 | 48.9 | 40.6 | 32.9 | 26.0 | 20.1 | 8.0 | 2.5 | 0.6 |
| DRBy | | 4 | 82.1 | 79.8 | 73.4 | 67.4 | 60.3 | 52.6 | 44.8 | 37.2 | 30.2 | 23.9 | 18.4 | 7.3 | 2.3 | 0.6 |
| DRBy | | 5 | 73.4 | 71.4 | 65.7 | 60.3 | 53.9 | 47.1 | 40.1 | 33.3 | 27.0 | 21.4 | 16.5 | 6.5 | 2.1 | 0.5 |
| DRBy | | 6 | 64.1 | 62.4 | 57.4 | 52.6 | 47.1 | 41.1 | 35.0 | 29.1 | 23.6 | 18.7 | 14.4 | 5.7 | 1.8 | 0.5 |
| DRBy | | 7 | 54.6 | 53.1 | 48.9 | 44.8 | 40.1 | 35.0 | 29.8 | 24.8 | 20.1 | 15.9 | 12.3 | 4.9 | 1.5 | 0.4 |
| DRBy | | 8 | 45.4 | 44.1 | 40.6 | 37.2 | 33.3 | 29.1 | 24.8 | 20.6 | 16.7 | 13.2 | 10.2 | 4.0 | 1.3 | 0.3 |
| DRBy | | 9 | 36.8 | 35.8 | 32.9 | 30.2 | 27.0 | 23.6 | 20.1 | 16.7 | 13.5 | 10.7 | 8.3 | 3.3 | 1.0 | 0.3 |
| DRBy | | 10 | 29.1 | 28.3 | 26.0 | 23.9 | 21.4 | 18.7 | 15.9 | 13.2 | 10.7 | 8.5 | 6.5 | 2.6 | 0.8 | 0.2 |
| DRCy | | 11 | 22.5 | 21.8 | 20.1 | 18.4 | 16.5 | 14.4 | 12.3 | 10.2 | 8.3 | 6.5 | 5.0 | 2.0 | 0.6 | 0.2 |
| DRCy | | 14 | 8.9 | 8.7 | 8.0 | 7.3 | 6.5 | 5.7 | 4.9 | 4.0 | 3.3 | 2.6 | 2.0 | 0.8 | 0.3 | 0.1 |
| DRCy | | 17 | 2.8 | 2.7 | 2.5 | 2.3 | 2.1 | 1.8 | 1.5 | 1.3 | 1.0 | 0.8 | 0.6 | 0.3 | 0.1 | 0.0 |
| DRCy | | 20 | 0.7 | 0.7 | 0.6 | 0.6 | 0.5 | 0.5 | 0.4 | 0.3 | 0.3 | 0.2 | 0.2 | 0.1 | 0.0 | 0.0 |

FIG. 11

LUT1

| INDEX | x DISTANCE | y DISTANCE |
|---|---|---|
| 0 | 0 | 0 |
| 1 | 0 | 1.5 |
| 2 | 0 | 3 |
| ⋮ | ⋮ | ⋮ |
| 15 | 0 | 20 |
| 16 | 1.5 | 0 |
| 17 | 1.5 | 1.5 |
| 18 | 1.5 | 3 |
| ⋮ | ⋮ | ⋮ |
| 31 | 1.5 | 20 |
| ⋮ | ⋮ | ⋮ |
| ⋮ | ⋮ | ⋮ |
| 240 | 20 | 0 |
| 241 | 20 | 1.5 |
| 242 | 20 | 3 |
| ⋮ | 20 | ⋮ |
| 255 | 20 | 20 |

LUT2

| INDEX | ATTENUATION FACTOR |
|---|---|
| 0 | 100.0 |
| 1 | 97.3 |
| 2 | 89.5 |
| ⋮ | ⋮ |
| 15 | 0.7 |
| 16 | 97.3 |
| 17 | 94.6 |
| 18 | 87.0 |
| ⋮ | ⋮ |
| 31 | 0.7 |
| ⋮ | ⋮ |
| ⋮ | ⋮ |
| 240 | 0.7 |
| 241 | 0.7 |
| 242 | 0.6 |
| ⋮ | ⋮ |
| 255 | 0.0 |

DISPLAY SYSTEM AND CIRCUIT FOR PERFORMING COLOR CORRECTION ON IMAGE DATA BASED ON ATTENUATION FACTOR DISTRIBUTION OF LIGHT WITH RESPECT TO DISTANCE

The present application is based on, and claims priority from JP Application Serial Number 2023-051047, filed Mar. 28, 2023, the disclosure of which is hereby incorporated by reference herein in its entirety.

BACKGROUND

1. Technical Field

The present disclosure relates to a circuit apparatus, a display system, and the like.

2. Related Art

JP-A-2019-095559 discloses an image display apparatus that performs local dimming. The image display apparatus includes an LED output value calculation unit, a display luminance data calculation unit, and an LCD data calculation unit. The LED output value calculation unit obtains light emission luminance data indicating luminance during light emission of a light source corresponding to each area of an image. The display luminance data calculation unit obtains spread luminance data by performing convolution processing using a point spread function or a luminance spread function on the light emission luminance data. As the point spread function or the luminance spread function, a table in which distances are input is used, and the distances are at equal intervals. A linear interpolation unit obtains display luminance data, which is data having a value per pixel for each primary color, by performing linear interpolation processing on the spread luminance data. The LCD data calculation unit obtains a light transmittance per pixel for each primary color based on input image data and the display luminance data, and outputs data representing the light transmittance as LCD data.

JP-A-2019-095559 is an example of the related art.

SUMMARY

An attenuation factor distribution indicates a relationship between a distance from a light source element to a pixel and an attenuation factor of light with which the light source element illuminates the pixel. In such an attenuation factor distribution, there is a portion where a change in the attenuation factor with respect to the distance is steep and a portion where the change is gentle. In a case where an attenuation factor distribution table is created with distances of equal intervals, when calculation accuracy of the attenuation factor is to be increased, it is necessary to reduce the intervals of the distances, and thus a storage capacity of the table increases. Thus, there is a problem that it is difficult to increase the calculation accuracy of the attenuation factor while reducing the storage capacity of the table.

An aspect of the disclosure relates to a circuit apparatus that controls a display apparatus including a plurality of light source elements and a display panel, the circuit apparatus including: a storage unit configured to store a look-up table indicating an attenuation factor distribution of light with respect to a distance between each of the light source elements and a pixel; an illumination luminance calculation circuit configured to calculate, based on attenuation factor information output from the look-up table and light source luminance information indicating luminance of light emitted by each light source element of the plurality of light source elements, illumination luminance information indicating luminance at which a target pixel of the display panel is illuminated by the plurality of light source elements; and a color correction circuit configured to perform color correction on input image data based on the illumination luminance information, in which the look-up table outputs the attenuation factor information with a first distance resolution in a first distance range and outputs the attenuation factor information with a second distance resolution higher than the first distance resolution in a second distance range in which a slope of the attenuation factor distribution is larger than that in the first distance range.

Another aspect of the disclosure relates to a display system including the circuit apparatus and the display apparatus.

BRIEF DESCRIPTION OF THE DRAWINGS

FIG. 5 is a first detailed example of a look-up table.

FIG. 7 is a second detailed example of the look-up table.

FIG. 8 is a third detailed example of the look-up table.

FIG. 10 is a fourth detailed example of the look-up table.

FIG. 11 is the fourth detailed example of the look-up table.

DESCRIPTION OF EMBODIMENTS

Hereinafter, a preferred embodiment of the disclosure will be described in detail. The embodiment described below does not unduly limit the contents of the claims, and not all of the configurations described in the embodiment are essential configuration requirements.

1. Electronic Device, Display System, and Circuit Apparatus

Figure 1:
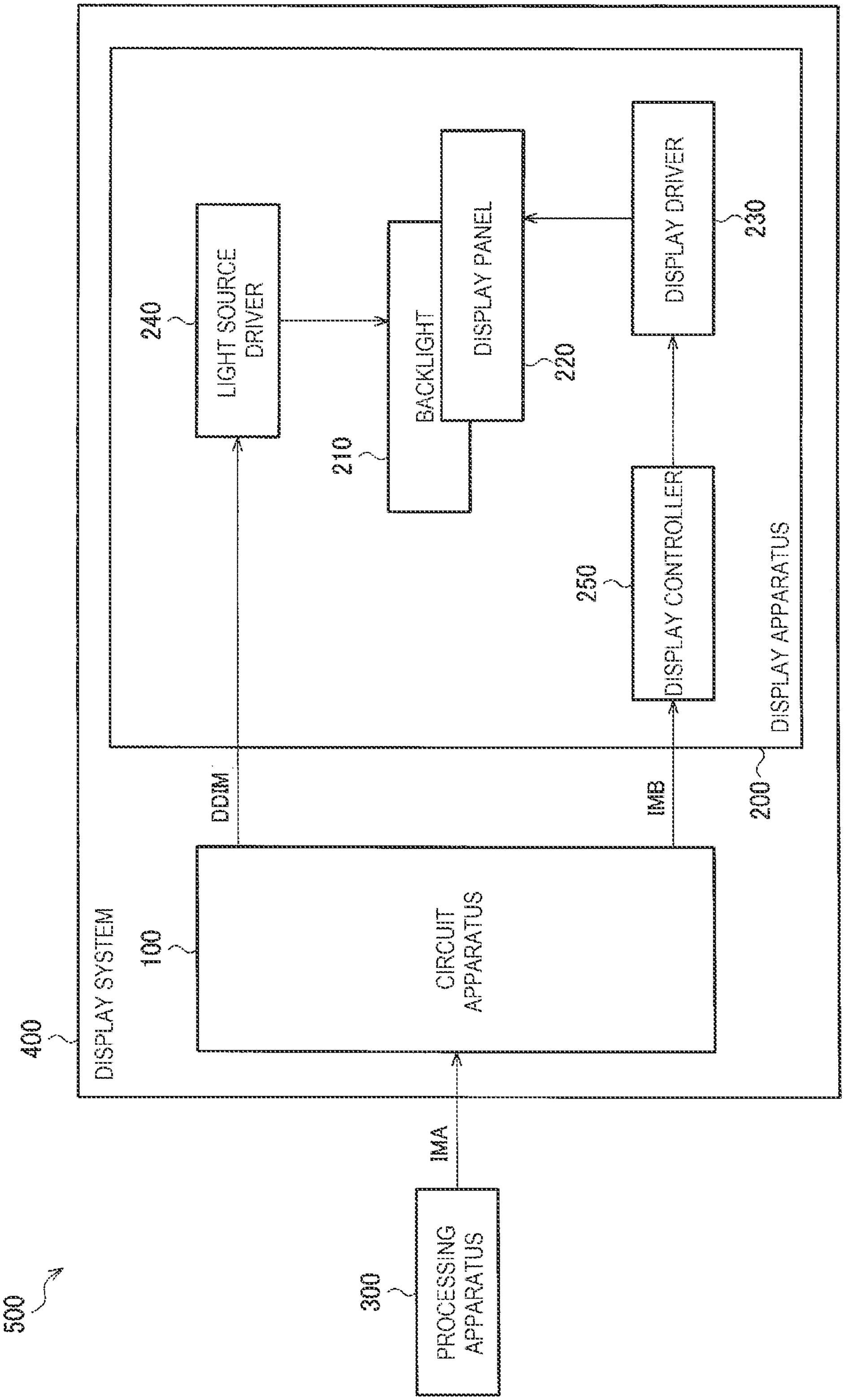
FIG. 1 is a configuration example of an electronic device.

FIG. 1 is a configuration example of an electronic device including a display system according to the embodiment. An electronic device 500 includes a processing apparatus 300 and a display system 400. The electronic device 500 is, for example, an in-vehicle display device including a meter panel, a center information display, a head-up display, or an electronic mirror, a television apparatus, or an information processing apparatus including a display.

The display system 400 includes a circuit apparatus 100 and a display apparatus 200. The circuit apparatus 100 is, for example, an integrated circuit apparatus in which a plurality of circuit elements are integrated on a semiconductor substrate. The circuit apparatus 100 and the display apparatus 200 are shown as separate components in FIG. 1, and alternatively, the circuit apparatus 100 may be provided in the display apparatus 200.

The display apparatus 200 includes a backlight 210, a display panel 220, a display driver 230, a light source driver

240, and a display controller 250. An example of the display apparatus 200 is a display used in a television apparatus, an information processing apparatus, or the like. Alternatively, the display apparatus 200 may be a head-mounted display including a projection apparatus for eyes, a head-up display including a projection apparatus for a screen, or the like. When the display apparatus 200 is a head-up display, the display apparatus 200 further includes an optical system for projecting light, which is emitted from the backlight 210 and transmitted through the display panel 220, onto a screen.

In a plan view of the backlight 210, light source elements are two-dimensionally disposed in the backlight 210. Each light source element is a light-emitting element that emits light by electric power supply, and is, for example, an inorganic light-emitting diode or an organic light-emitting diode. In local dimming control, a light quantity of each of the light source elements disposed two-dimensionally is independently controlled. Alternatively, the backlight 210 may be divided into a plurality of areas. In a plan view, a plurality of light source elements are disposed in each area. The light source elements disposed in the area are controlled to have the same light quantity, and a light quantity of each area is independently controlled.

An example of a two-dimensional disposition of the light source elements is a square disposition in which the light source elements are disposed at all intersections of a plurality of rows and a plurality of columns. However, the two-dimensional disposition is not limited to the square disposition. For example, the two-dimensional disposition may be a disposition called a rhombus disposition or a zigzag disposition. In such a disposition, the light source elements are disposed at intersections of one of an odd row and an even row with an odd column, and intersections of the other of the odd row and the even row with an even column, and no light source element is disposed at other intersections.

The light source driver 240 receives light source luminance data DDIM from the circuit apparatus 100, and drives each light source element of the backlight 210 based on the light source luminance data DDIM. The light source driver 240 is, for example, an integrated circuit apparatus. A plurality of light source drivers may be provided, and each of the light source drivers may be a separate integrated circuit apparatus.

The display panel 220 is an electro-optical panel that transmits light from the backlight 210 and displays an image by controlling a transmittance thereof. For example, the display panel 220 is a liquid crystal display panel.

The display controller 250 receives image data IMB from the circuit apparatus 100, and transmits the image data IMB and a timing control signal for controlling a display timing to the display driver 230. The display controller 250 may perform image processing such as tone correction, white balance correction, or enlargement and reduction on the received image data IMB.

The display driver 230 displays an image on the display panel 220 by driving the display panel based on the received image data and the timing control signal. The display controller 250 and the display driver 230 may be implemented by separate integrated circuit apparatuses, or may be implemented integrally by an integrated circuit apparatus.

The processing apparatus 300 transmits image data IMA to the circuit apparatus 100. The processing apparatus 300 is a processor such as a CPU, a GPU, a microcomputer, a DSP, an ASIC, or an FPGA. The CPU is an abbreviation for a central processing unit. The GPU is an abbreviation for a graphics processing unit. The DSP is an abbreviation for a digital signal processor. The ASIC is an abbreviation for an application specific integrated circuit. The FPGA is an abbreviation for a field programmable gate array.

The circuit apparatus 100 receives the image data IMA and performs local dimming control of the display apparatus 200 based on the image data IMA. The circuit apparatus 100 adjusts light emission luminance of each light source element of the backlight 210 or each area according to luminance of the image data IMA, and outputs light source luminance information obtained by the light adjustment as the light source luminance data DDIM to the light source driver 240. The circuit apparatus 100 performs color correction on the image data IMA based on the light source luminance information and outputs the image data IMB after the color correction to the display controller 250.

Figure 2:
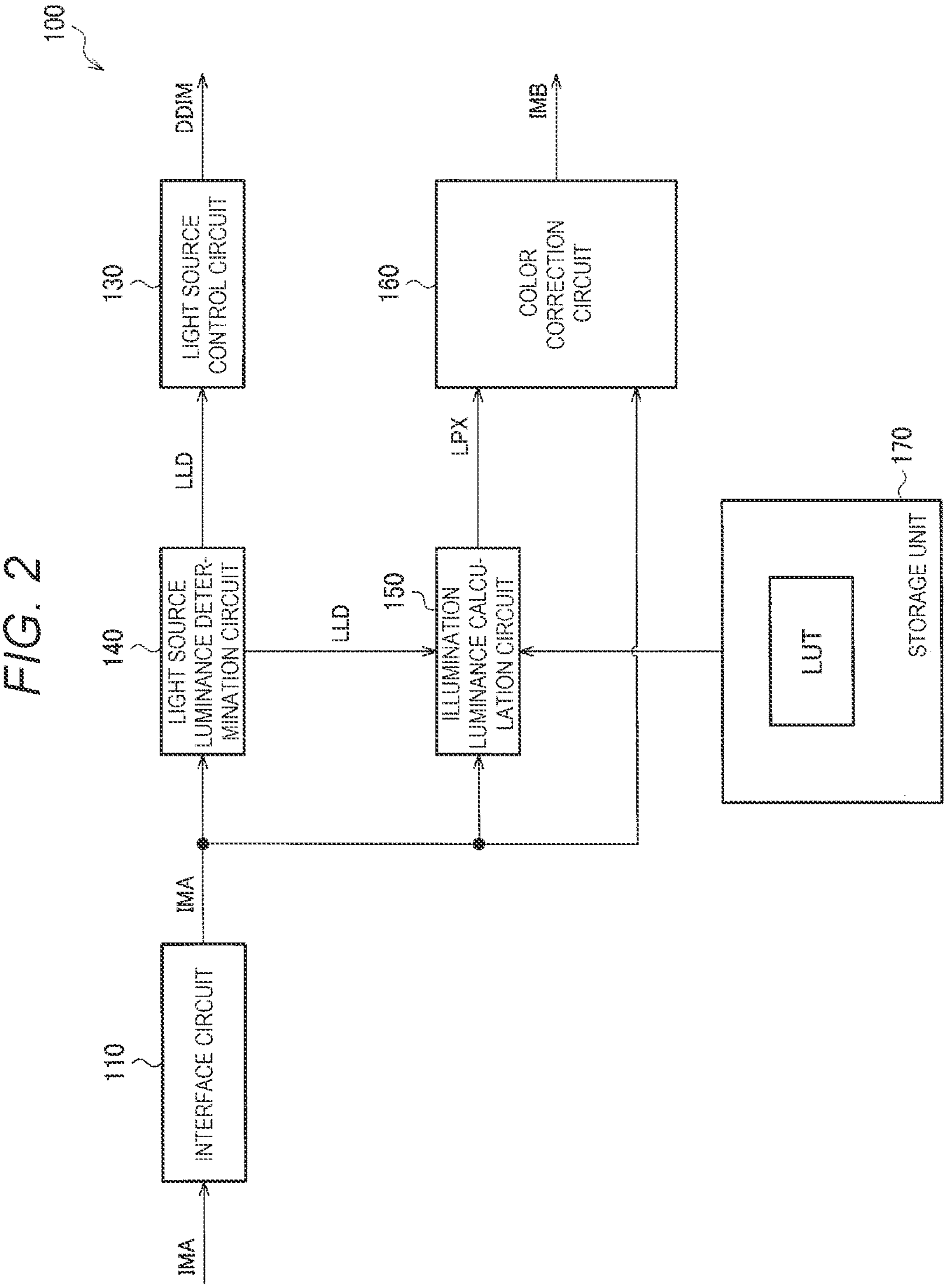
FIG. 2 is a detailed configuration example of a circuit apparatus.

FIG. 2 is a detailed configuration example of the circuit apparatus. The circuit apparatus 100 includes an interface circuit 110, a light source control circuit 130, a light source luminance determination circuit 140, an illumination luminance calculation circuit 150, a color correction circuit 160, and a storage unit 170. Hereinafter, a case where light is independently adjusted for each light-emitting element of the backlight 210 in local dimming will be described as an example, and alternatively, light may be independently adjusted for each area including a plurality of light-emitting elements.

The interface circuit 110 receives the image data IMA from the processing apparatus 300. The interface circuit 110 may be an interface circuit of various image interface methods such as LVDS, a parallel RGB method, or a display port. The LVDS is an abbreviation for low voltage differential signaling.

The storage unit 170 stores a look-up table LUT indicating an attenuation factor distribution of light reaching the display panel from the light source element. The attenuation factor distribution indicates a relationship between a distance from the light source element to a pixel and an attenuation factor of light with which the light source element illuminates the pixel. The attenuation factor distribution is also referred to as an attenuation characteristic or a luminance distribution. The storage unit 170 is a register or a memory. The memory is a volatile memory such as a RAM or a non-volatile memory such as an OTP memory or an EEPROM. The RAM is an abbreviation for a random access memory. The OTP is an abbreviation for one time programmable. The EEPROM is an abbreviation for an electrically erasable programmable read only memory.

The image data IMA is input from the interface circuit 110 to the light source luminance determination circuit 140. The image data IMA input to the light source luminance determination circuit 140 is also referred to as input image data. The light source luminance determination circuit 140 analyzes luminance of the image data IMA, determines light emission luminance of each light-emitting element based on a result of the analysis, and outputs light source luminance information indicating the light emission luminance of each light-emitting element as light source luminance data LLD. Specifically, the light source luminance determination circuit 140 determines, in an image area corresponding to the light-emitting element of the backlight 210, maximum luminance of pixel data belonging to the image area. The light source luminance determination circuit 140 determines minimum light emission luminance within a range in which the maximum luminance can be displayed on the display apparatus 200, and sets the minimum light emission luminance as the light emission luminance of the light-emitting element. Alternatively, the light source luminance determination circuit 140 may determine the light emission luminance of each light source element by performing light adjustment processing using the image data IMA and the look-up table LUT stored in the storage unit 170. Details of this method will be described later.

The light source control circuit 130 controls the light source driver 240 based on the light source luminance data LLD. Specifically, the light source control circuit 130 outputs a timing control signal for controlling a light emission timing of the light-emitting element or an update timing of the light emission luminance to the light source driver 240, and outputs the light source luminance data LLD as the light source luminance data DDIM to the light source driver 240. The light source driver 240 drives, at a timing defined by the timing control signal, each light-emitting element by a PWM signal having a pulse width corresponding to the light emission luminance of each light source element indicated by the light source luminance data DDIM. Accordingly, each light-emitting element emits light with the light emission luminance controlled by local dimming.

The illumination luminance calculation circuit 150 calculates illumination luminance information based on the light source luminance data LLD and the look-up table stored in the storage unit 170, and outputs the illumination luminance information as illumination luminance data LPX. The illumination luminance information indicates illumination luminance of each pixel of the display panel 220 when the display panel 220 is illuminated by the backlight 210.

The color correction circuit 160 performs color correction on the image data IMA based on the illumination luminance data LPX and outputs the corrected image data IMB to the display driver 230. Specifically, the color correction circuit 160 multiplies pixel data of each pixel by a reciprocal of luminance of light reaching the pixel and uses a result thereof as new pixel data of the pixel.

The light source control circuit 130, the light source luminance determination circuit 140, the illumination luminance calculation circuit 150, and the color correction circuit 160 are logic circuits that process digital signals. The light source control circuit 130, the light source luminance determination circuit 140, the illumination luminance calculation circuit 150, and the color correction circuit 160 may be implemented by separate logic circuits, or a part or all thereof may be implemented by an integrated logic circuit. Alternatively, a processor such as a DSP may execute an instruction set or a program describing functions of the light source control circuit 130, the light source luminance determination circuit 140, the illumination luminance calculation circuit 150, and the color correction circuit 160 to implement the functions of the circuits.

Alternatively, the circuit apparatus 100 may be a processor such as a CPU, a GPU, a microcomputer, a DSP, an ASIC, or an FPGA. A function of the circuit apparatus 100 may be implemented by the processor executing an instruction set or a program describing the function of each unit of the circuit apparatus 100.

The circuit apparatus 100 may include a distortion correction circuit. The distortion correction circuit corrects image distortion caused by an optical system that projects an image displayed on the display panel 220 onto a screen or the like, or image distortion caused by screen distortion. Specifically, the distortion correction circuit performs image correction for canceling or reducing the image distortion on the image data IMA received by the interface circuit 110 and outputs the corrected image data to the light source luminance determination circuit 140, the illumination luminance calculation circuit 150, and the color correction circuit 160.

However, the distortion correction circuit may be provided in the processing apparatus 300 instead of the circuit apparatus 100.

2. Illumination Luminance Calculation Circuit

Figure 3:
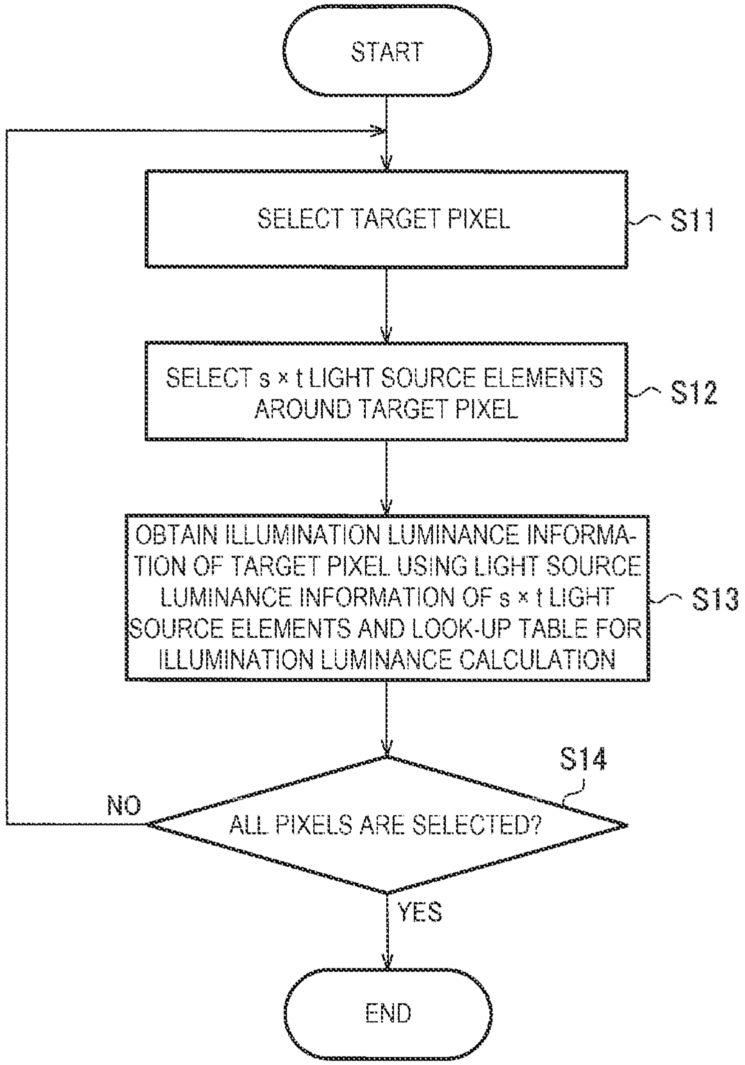
FIG. 3 is a flow of processing performed by an illumination luminance calculation circuit.

FIG. 3 is a flow of processing performed by the illumination luminance calculation circuit.

In step S11, the illumination luminance calculation circuit 150 selects one pixel from the pixels in the image data IMA. The selected pixel is referred to as a target pixel. In a loop from step S11 to step S14, target pixels are sequentially selected. For example, when the first pixel on the first scanning line of the image data IMA is selected in first step S11, the second pixel, the third pixel, . . . are selected sequentially in subsequent steps S11, and when all pixels on the first scanning line are selected, the pixels on the second scanning line are selected sequentially, and so on until the last scanning line.

Figure 4:
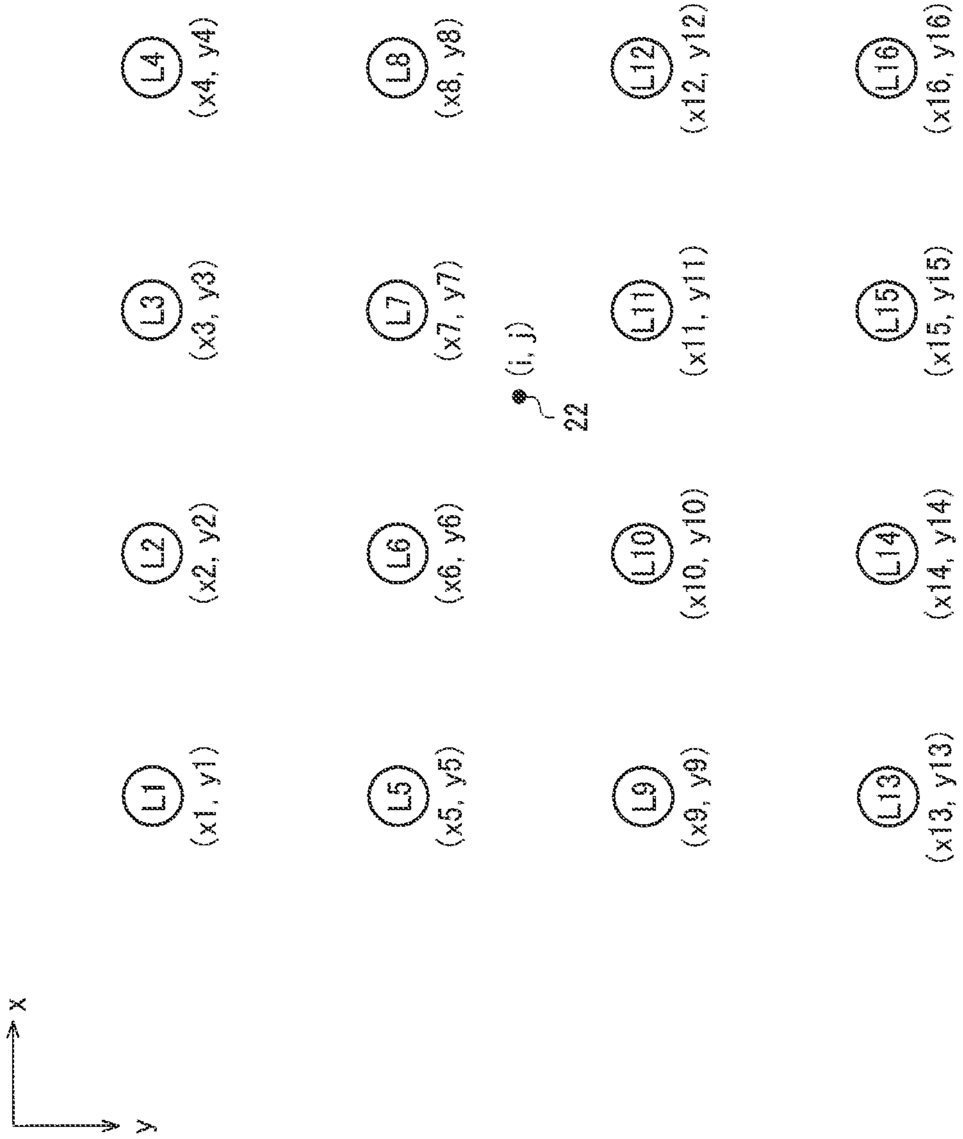
FIG. 4 is an example of surrounding light source elements.

In step S12, the illumination luminance calculation circuit 150 selects s×t light source elements around the target pixel. The s×t light source elements are also referred to as surrounding light source elements. FIG. 4 shows an example of surrounding light source elements. Here, an example in which s=4 and t=4 is shown, and s and t may each be an integer of 2 or more. In FIG. 4, an x direction is a horizontal scanning direction of the display panel, and a y direction is a vertical scanning direction of the display panel.

A position of a target pixel 22 is (i, j). Each of i and j is an integer, and the position (i, j) indicates an i-th pixel on a j-th scanning line. The illumination luminance calculation circuit 150 selects light source elements L1 to L16 in nearest two columns in each of a +x direction and a −x direction and in nearest two rows in each of a +y direction and a −y direction with reference to the position (i, j). A position of a light source element Lβ is represented by (xβ, yβ), in which β is an integer of 1 or more and 16 or less.

In step S13, the illumination luminance calculation circuit 150 obtains illumination luminance information of the target pixel using light source luminance information of the selected s×t light source elements and the look-up table LUT.

In step the S14, illumination luminance calculation circuit 150 determines whether all pixels are selected as target pixels, ends the processing when all pixels are selected, and returns to step S11 when there is any unselected pixel.

Calculation processing of the illumination luminance information in step S13 will be described using the example in FIG. 4. The illumination luminance calculation circuit 150 obtains the illumination luminance information of the target pixel 22 by the following equations (1) and (2).

$$PL(i,j)=\sum_{\beta=1}^{s\times t} pow(\beta)\times lsf(\beta) \tag{1}$$

$$lsf(\beta)=lsf\left((i-x\beta)^2+(j-y\beta)^2\right) \tag{2}$$

In the equation (1), PL(i, j) is illumination luminance information relative to a pixel at the position (i, j). The light source luminance information determined by the light source luminance determination circuit 140 is represented by pow(β). Here, lsf(β) is an attenuation factor of light with which the light source element Lβ illuminates the target pixel 22. The illumination luminance calculation circuit 150 obtains lsf(β) using the look-up table LUT. In the equation (2), a square of the distance is used as an input to the look-up table, and alternatively, the distance may be used as the input to the look-up table.

The illumination luminance calculation circuit 150 may obtain the illumination luminance information of the target pixel from not only the light source luminance information of the s×t light source elements around the target pixel but light source luminance information of all light source elements of the backlight 210.

Hereinafter, a detailed example of the look-up table LUT will be described. The look-up table LUT outputs, with respect to input distance information, attenuation factor information associated with the distance information. Hereinafter, an example in which the distance information is a distance or a square of the distance and the attenuation factor information is an attenuation factor expressed as a percentage of 100 will be described, but the disclosure is not limited thereto. The distance information may be the number of pixels, or the like. The attenuation factor information may be an attenuation factor represented in any unit.

Figure 6:
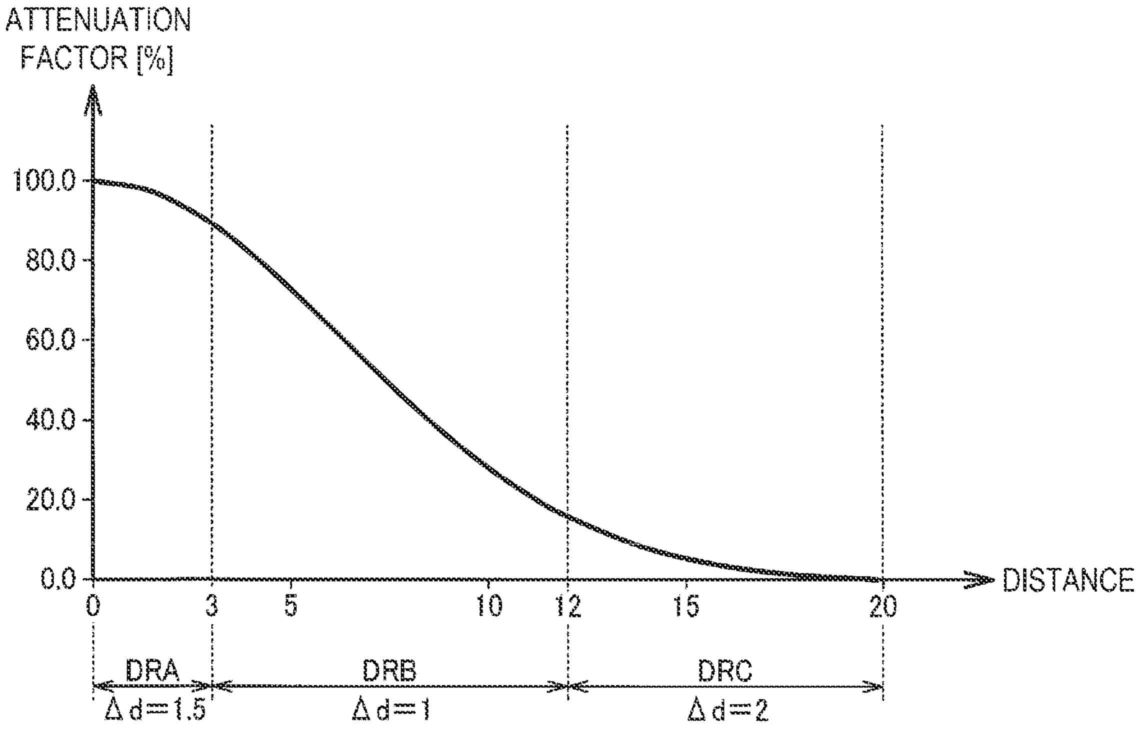
FIG. 6 is an example of an attenuation factor distribution in the first detailed example of the look-up table.

FIG. 5 is a first detailed example of the look-up table. FIG. 6 is an example of an attenuation factor distribution in the first detailed example of the look-up table.

Light from the light source element is diffused by a diffusion sheet or the like, and the diffused light is emitted to the display panel. At this time, a luminance distribution of the light due to the diffusion is an attenuation factor distribution. Specifically, an attenuation factor distribution corresponding to characteristics of the light source element and the diffusion sheet or an attenuation factor distribution approximating such an attenuation factor distribution is converted into a table and stored in the storage unit 170 as the look-up table LUT. The processing apparatus 300 in FIG. 1 may write the look-up table LUT in the storage unit 170 or, when the storage unit 170 includes a non-volatile memory, the look-up table LUT may be stored in the non-volatile memory in advance. The look-up table LUT can be freely programmed, and may be changed according to a model of the display apparatus 200, for example.

As shown in FIG. 5, the look-up table LUT includes a first look-up table LUT1 storing a distance and a second look-up table LUT2 storing an attenuation factor.

Each index in the first look-up table LUT1 stores a distance associated with the index. Here, an example in which the index is 0 to 15 is shown, but the index may be any number. In addition, an example in which the distance is in a range of 0 to 20 and distance resolutions are independently set in each of three distance ranges is shown, but the range of the distance may be any range, and the number of the distance ranges may be two or more. The index is, for example, a memory address.

Each index in the second look-up table LUT2 stores an attenuation factor associated with the index. The attenuation factor is represented by a value normalized with maximum luminance being 100%. The attenuation factor distribution has a maximum value near a distance of zero and decreases as the distance increases. A slope of the decrease changes according to the distance. However, in an attenuation factor distribution in consideration of reflected light or the like, a decreasing section and an increasing section may co-exist.

For example, when the distance input to the look-up table LUT is 2, the illumination luminance calculation circuit 150 sequentially reads distances in the respective indexes from the first look-up table LUT1 and compares the distances with the input distance 2, thereby determining indexes "1" and "2" corresponding to a distance 1.5 and a distance 3 sandwiching the input distance 2. The selected index "1" is a first index, and the index "2" is a second index. The first index is a distance equal to or less than the input distance and closest to the input distance among the distances stored in the first look-up table LUT1. The second index is a distance equal to or larger than the input distance and closest to the input distance among the distances stored in the first look-up table LUT1. The illumination luminance calculation circuit 150 reads attenuation factors 97.2% and 89.4% of the indexes "1" and "2" from the second look-up table LUT2. The attenuation factor 97.2% stored in the first index "1" is first attenuation factor information, and the attenuation factor 89.4% stored in the second index "2" is second attenuation factor information. The illumination luminance calculation circuit 150 obtains an attenuation factor corresponding to the input distance 2 by interpolating the first attenuation factor information and the second attenuation factor information. The interpolation is, for example, linear interpolation, spline interpolation, or Lagrange interpolation.

As shown in FIG. 6, a slope of an attenuation factor distribution in a distance range DRA of a distance of 0 to 3 is smaller than a slope of an attenuation factor distribution in a distance range DRB of a distance of 3 to 12. A slope of an attenuation factor distribution in a distance range DRC of a distance of 12 to 20 is smaller than the slope of the attenuation factor distribution in the distance range DRB of the distance of 3 to 12. The term "slope" is an absolute value of a slope, that is, an absolute value of a differential value obtained by differentiating the attenuation factor distribution with respect to the distance. The expression "the slope is small" means, for example, that an average value of slopes in the distance range is small or a maximum value of the slopes in the distance range is small.

As shown in FIGS. 5 and 6, in each distance range, the look-up table LUT is created with a distance resolution corresponding to the slope. The distance resolution is a distance interval when the attenuation factor distribution is formed into a table, and is a distance interval per step of the index. The expression "the distance resolution is high" means that the distance interval per step of the index is small. A distance resolution Δd is 1.5 in the distance range DRA, 1 in the distance range DRB, and 2 in the distance range DRC. That is, the distance resolution Δd is high in the distance range DRB where the slope of the attenuation factor distribution is relatively large, and the distance resolution Δd is low in the distance ranges DRA and DRC where the slope of the attenuation factor distribution is relatively small. FIG. 5 shows an example in which the distance resolution Δd in the distance range DRC is lower than the distance resolution Δd in the distance range DRA, and alternatively, the distance resolution Δd in the distance range DRC may be equal to or higher than the distance resolution Δd in the distance range DRA.

By increasing the distance resolution Δd in a distance range in which the slope of the attenuation factor distribution is relatively large, accuracy of the illumination luminance information can be improved. By decreasing the distance resolution Δd in a distance range in which the slope of the attenuation factor distribution is relatively small, a storage capacity of the look-up table LUT can be saved.

FIG. 7 is a second detailed example of the look-up table. The attenuation factor distribution is the same as that in the first detailed configuration example.

The look-up table LUT includes the first look-up table LUT1 storing a square of the distance and the second look-up table LUT2 storing the attenuation factor. The first look-up table LUT1 in FIG. 7 is a table obtained by squaring the distance in the first look-up table LUT1 in FIG. 5. The second look-up table LUT2 in FIG. 7 is the same as the second look-up table LUT2 in FIG. 5.

Thus, the distance information used in the look-up table LUT may be the square of the distance. When a distance in the horizontal scanning direction of the display panel is an x distance and a distance in the vertical scanning direction of the display panel is a y distance, $(\text{distance})^2=(\text{x distance})^2+(\text{y distance})^2$. That is, by using the square of the distance as an input to the look-up table LUT, it is possible to use a square root of $(\text{x distance})^2+(\text{y distance})^2$ directly as the input to the look-up table LUT without calculation.

Figure 9:
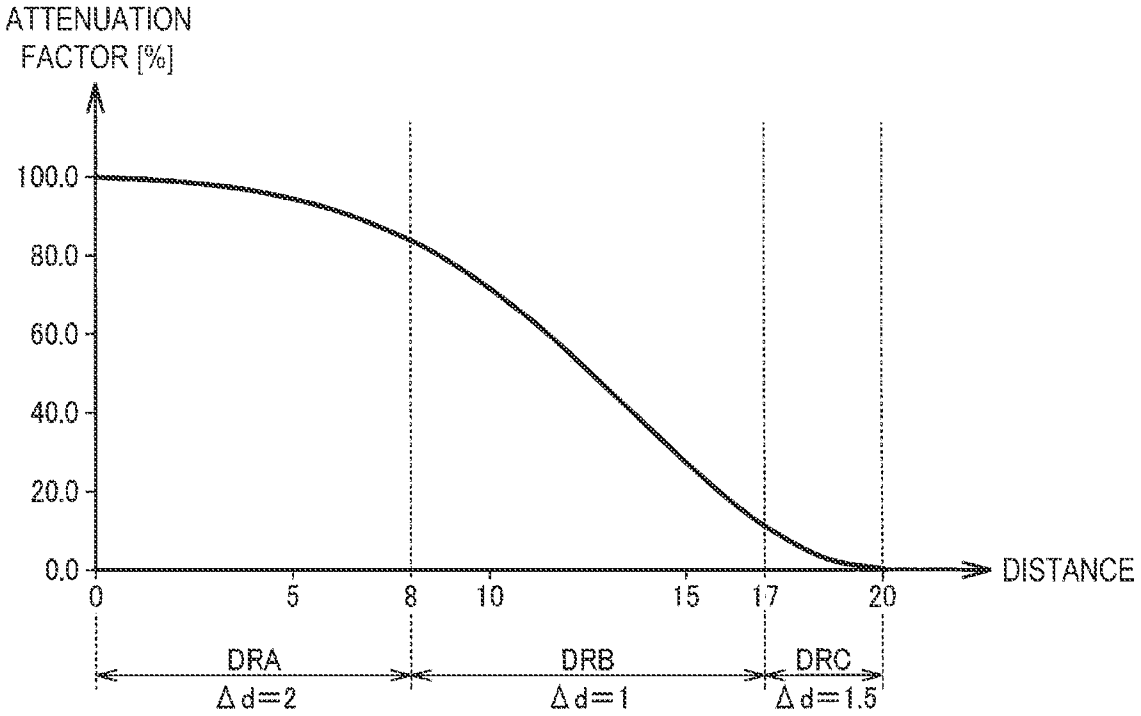
FIG. 9 is an example of an attenuation factor distribution in the third detailed example of the look-up table.

FIG. 8 is a third detailed example of the look-up table. FIG. 9 is an example of an attenuation factor distribution in the third detailed example of the look-up table. This attenuation factor distribution is different from the attenuation factor distribution in the first detailed configuration example.

As shown in FIG. 9, the slope of the attenuation factor distribution in the distance range DRA of a distance of 0 to 8 is smaller than the slope of the attenuation factor distribution in the distance range DRB of a distance of 8 to 17. The slope of the attenuation factor distribution in the distance range DRC of a distance of 17 to 20 is smaller than the slope of the attenuation factor distribution in the distance range DRB of the distance of 8 to 17. As shown in FIGS. 8 and 9, the distance resolution Δd is 2 in the distance range DRA, 1 in the distance range DRB, and 1.5 in the distance range DRC.

Thus, the distance ranges DRA, DRB, and DRC may be variably set. In addition, the distance resolution Δd in each distance range may be variably set. In both the first detailed configuration example and the third detailed configuration example, the distance resolution Δd in the distance range DRB is 1, and alternatively, the distance resolution Δd in the distance range DRB may be other than 1. The look-up table LUT can be written to the storage unit 170 from the processing apparatus 300 or from the outside such as a test apparatus, and the look-up table LUT can be freely programmed accordingly. Accordingly, the distance ranges DRA, DRB, and DRC, and the distance resolution Δd in each distance range are variably set.

FIGS. 10 and 11 show a fourth detailed example of the look-up table. The look-up table LUT in this example is a two-dimensional look-up table to which the x distance and the y distance are input.

As shown in FIG. 10, a distance resolution related to the x distance is 1.5 in a distance range DRAx of 0 to 3, 1 in a distance range DRBx of 3 to 11, and 3 in a distance range DRCx of 11 to 20. A distance resolution related to the y distance is 1.5 in a distance range DRAy of 0 to 3, 1 in a distance range DRBy of 3 to 11, and 3 in a distance range DRCy of 11 to 20. The distance ranges DRAx and DRAy may be different from each other, and the distance resolution may be different between the distance ranges DRAx and DRAy. The distance ranges DRBx and DRBy may be different from each other, and the distance resolution may be different between the distance ranges DRBx and DRBy. The distance ranges DRCx and DRCy may be different from each other, and the distance resolution may be different between the distance ranges DRCx and DRCy.

The look-up table LUT in this example shows an attenuation factor distribution corresponding to ¼ of an xy plane with a position of a light source element serving as an origin. That is, an area where $x\geq0$ and $y\geq0$ is a first quadrant, an area where $x\geq0$ and $y\leq0$ is a second quadrant, an area where $x\leq0$ and $y\geq0$ is a third quadrant, and an area where $x\leq0$ and $y\leq0$ is a fourth quadrant. The look-up table LUT indicates an attenuation factor distribution in one quadrant among the first to fourth quadrants. When the x distance and the y distance are absolute values of the distance, the look-up table can be symmetrically applied to each quadrant of the first to fourth quadrants. The look-up table LUT may indicate an attenuation factor distribution corresponding to ⅛ of the xy plane with the position of the light source element as the origin. That is, the look-up table in FIG. 10 may be divided into two look-up tables with x distance=y distance as a boundary, and one thereof may be stored as the look-up table LUT in the storage unit 170. Specifically, the look-up table LUT may be a look-up table that stores an attenuation factor corresponding to an x distance and a y distance that satisfy x distance ≥y distance or x distance ≤y distance. For example, in a case where the look-up table LUT stores the attenuation factor corresponding to the x distance and the y distance that satisfy x distance ≥y distance, when the x distance and the y distance that satisfy x distance <y distance are input, the attenuation factor is obtained by swapping the x distance and the y distance and referring to the look-up table LUT.

As shown in FIG. 11, the look-up table LUT includes the first look-up table LUT1 storing a set of the x distance and the y distance, and the second look-up table LUT2 storing an attenuation factor.

For example, it is assumed that the x distance input to the look-up table LUT is 1 and the input y distance is 2. The illumination luminance calculation circuit 150 sequentially reads sets of the x distance and the y distance of each index from the first look-up table LUT1 and compares the read sets with a set of the input x distance 1 and the input y distance 2. Accordingly, the illumination luminance calculation circuit 150 determines indexes "1", "2", "17", and "18" corresponding to a distance 0 and a distance 1.5 sandwiching the input x distance 1 and a distance 1.5 and a distance 3 sandwiching the input y distance 2. The illumination luminance calculation circuit 150 reads attenuation factors 97.3%, 89.5%, 94.6%, and 87.0% of the indexes "1", "2", "17", and "18" from the second look-up table LUT2, and obtains an attenuation factor corresponding to the set of the input x distance 1 and the input y distance 2 by interpolation. The interpolation is, for example, bilinear interpolation or bicubic interpolation.

3. Light Source Luminance Determination Circuit

Figure 12:
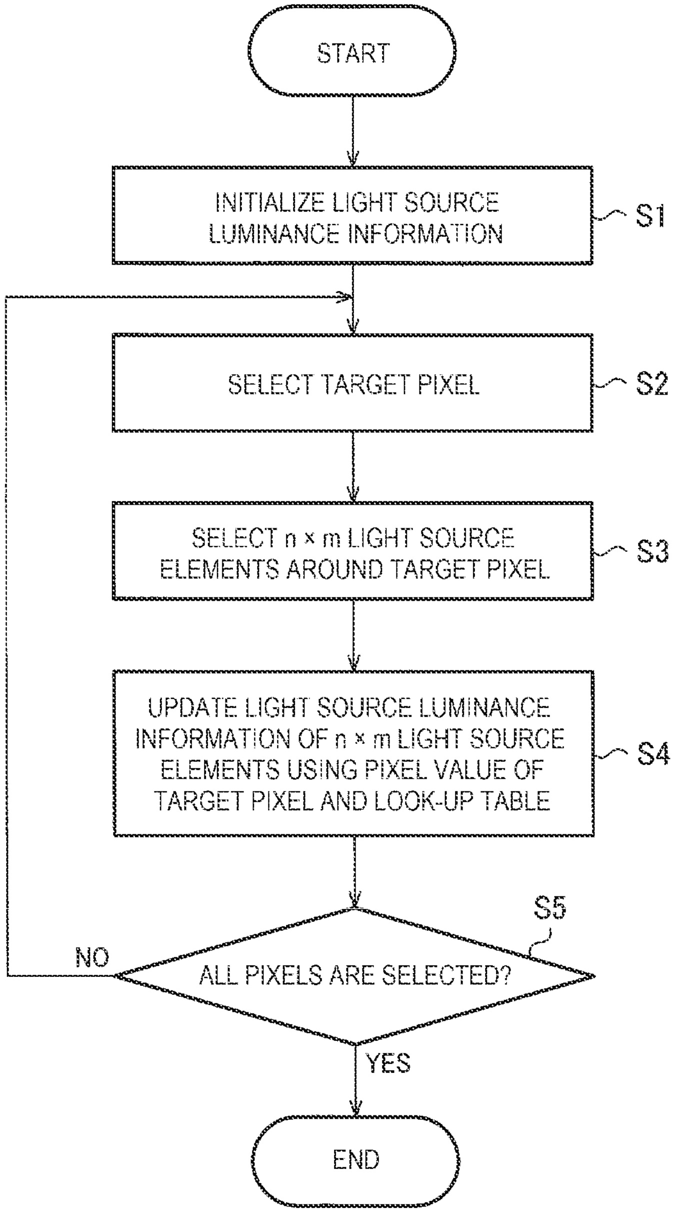
FIG. 12 is a flow of processing performed by a light source luminance determination circuit.

FIG. 12 is a flow of processing performed by the light source luminance determination circuit.

In step S1, the light source luminance determination circuit 140 initializes the light source luminance information. For example, luminance values of all light source elements are initialized to zero.

In step S2, the light source luminance determination circuit 140 selects one pixel from the pixels in the image data IMA. The selected pixel is referred to as a target pixel. In a loop from step S2 to step S5, target pixels are sequentially selected. For example, when the first pixel on the first scanning line of the image data IMA is selected in first step S2, the second pixel, the third pixel, . . . are selected sequentially in subsequent steps S2, and when all pixels on the first scanning line are selected, the pixels on the second scanning line are selected sequentially, and so on until the last scanning line.

In step S3, the light source luminance determination circuit 140 selects n×m light source elements around the target pixel. The n×m light source elements are also referred to as surrounding light source elements. Each of n and m may be an integer of 2 or more. An example will be described with reference to FIG. 4. Although FIG. 4 is used to describe the illumination luminance calculation circuit 150, the processing performed by the light source luminance determination circuit 140 is different from the processing performed by the illumination luminance calculation circuit 150.

As shown in FIG. 4, the position of the target pixel 22 is (i, j). Each of i and j is an integer, and the position (i, j) indicates an i-th pixel on a j-th scanning line. In the example in FIG. 4, n=m=4. The light source luminance determination circuit 140 selects light source elements L1 to L16 in nearest two columns in each of a +x direction and a −x direction and in nearest two rows in each of a +y direction and a −y direction with reference to the position (i, j). A position of a light source element Lk is represented by (xk, yk), in which k is an integer of 1 or more and 16 or less.

In step S4 in FIG. 12, light source luminance information for each of the n×m light source elements selected in step S3 is updated using a pixel value of the target pixel 22 in the image data IMA and the look-up table LUT stored in the storage unit 170.

In step S5, the light source luminance determination circuit 140 determines whether all pixels are selected as target pixels, ends the processing when all pixels are selected, and returns to step S2 when there is any unselected pixel.

Update processing of the light source luminance information in step S4 will be described using the example in FIG. 4. By the following equation (3), the light source luminance determination circuit 140 obtains a required change amount $\Delta_{ij}$ indicating a change amount required for a light quantity received by the target pixel 22 from the light source elements L1 to L16.

$$\Delta_{ij} = \mathrm{INT}_{ij} - \sum_{k=1}^{16} lsf(k) \times powc(k) \tag{3}$$

In the equation (3), $\mathrm{INT}_{ij}$ is a pixel intensity based on the pixel value of the target pixel 22 in the image data IMA. The pixel intensity is, for example, a luminance value calculated from RGB pixel values of the target pixel 22 or a maximum value among the RGB pixel values of the target pixel 22. As in the equation (2), lsf(k) is an attenuation factor of light with which the light source element Lk illuminates the target pixel 22, and is obtained from an actual attenuation factor distribution or an attenuation factor distribution approximating the actual attenuation factor distribution. The light source luminance determination circuit 140 obtains lsf(k) using the look-up table LUT. Previous light source luminance information of the light source element Lk is represented by powc(k). The previous light source luminance information is light source luminance information calculated using a previous target pixel selected one before the current target pixel 22. The previous target pixel is a pixel at a position (i−1, j) one before the position (i, j) in the x direction.

The light source luminance determination circuit 140 distributes the required change amount $\Delta_{ij}$ to light source luminance information of the light source element Lk by the following equation (4) to update the light source luminance information.

$$powu(k) = \begin{cases} powc(k) + \Delta_{ij} \dfrac{lsf^{x}(k)}{\sum_{\alpha=1}^{16} lsf^{x+1}(\alpha)}, & \text{if } \Delta_{ij} > 0 \\ powc(k), & \text{if } \Delta_{ij} \le 0 \end{cases} \tag{4}$$

In the equation (4), powu(k) is current light source luminance information, that is, the updated light source luminance information. In a second term on a right side of the equation (4), an attenuation factor $lsf^{x}(k)=lsf(k)$, and an attenuation factor $lsf^{x+1}(k)=lsf^{2}(k)=lsf(k)\times lsf(k)$. That is, the light source luminance determination circuit 140 obtains the attenuation factor lsf(k) using the look-up table LUT and calculates the second term on the right side using the attenuation factor lsf(k). Alternatively, the storage unit 170 may separately store a look-up table for calculating the attenuation factor $lsf^{x}(k)$ and the attenuation factor $lsf^{x+1}(k)$ in addition to the look-up table LUT, and the light source luminance determination circuit 140 may obtain the attenuation factor $lsf^{x}(k)$ and the attenuation factor $lsf^{x+1}(k)$ using such a look-up table.

After the loop of steps S2 to S5 in the flow in FIG. 12 is executed up to a last pixel in the image data IMA, powu in the equation (4) is used as pow in the equation (1). Even when the loop of steps S2 to S5 is not executed up to the last pixel in the image data IMA, update of light source luminance information of each light source element is sequentially completed as the target pixel advances, and thus the light source luminance information whose update is completed may be used as pow.

The circuit apparatus 100 according to the embodiment described above controls the display apparatus 200 including the plurality of light source elements and the display panel 220. The circuit apparatus 100 includes the storage unit 170, the illumination luminance calculation circuit 150, and the color correction circuit 160. The storage unit 170 stores the look-up table LUT indicating the attenuation factor distribution of light with respect to the distance between the light source element and the pixel. The illumination luminance calculation circuit 150 calculates, based on the attenuation factor information output from the look-up table LUT and the light source luminance information indicating the luminance of light emitted by each of the plurality of light source elements, the illumination luminance information indicating the luminance at which the target pixel of the display panel 220 is illuminated by the plurality of light source elements. The color correction circuit 160 performs color correction on the input image data based on the illumination luminance information. The look-up table LUT outputs the attenuation factor information with a first distance resolution in a first distance range and outputs the attenuation factor information with a second distance resolution higher than the first distance resolution in a second distance range in which a slope of the attenuation factor distribution is larger than that in the first distance range.

According to the embodiment, since the distance resolution is high in the second distance range in which the slope of the attenuation factor distribution is relatively large, the illumination luminance calculation circuit 150 can obtain the attenuation factor with high accuracy, and accordingly, accuracy of the illumination luminance information can be improved. Since the distance resolution is low in the first distance range in which the slope of the attenuation factor distribution is relatively small, the storage capacity of the look-up table LUT can be reduced, and a capacity of the storage unit 170 can be saved.

In the example in FIG. 2, the input image data corresponds to the image data IMA. Referring to FIG. 5 as an example, the first distance range corresponds to the distance range DRA or DRC, and the first distance resolution corresponds to the distance resolution Δd=1.5 in the distance range DRA or the distance resolution Δd=2 in the distance range DRC. The second distance range corresponds to the distance range DRB, and the second distance resolution corresponds to the distance resolution Δd=1 in the distance range DRB.

In the embodiment, in a third distance range in which the slope of the attenuation factor distribution is smaller than that in the second distance range, the look-up table LUT outputs the attenuation factor information with a third distance resolution lower than the second distance resolution. The second distance range is between the first distance range and the third distance range.

According to the embodiment, since the distance resolution is low in the third distance range in which the slope of the attenuation factor distribution is relatively small, the storage capacity of the look-up table LUT can be reduced, and the capacity of the storage unit 170 can be the saved. In the attenuation factor distribution, attenuation factor is close to 100% and the slope is small near the distance of zero, the slope increases as the distance increases, and the slope decreases again while the attenuation factor approaches 0% as the distance further increases. Therefore, for example, the first distance range can be set near the distance of zero, the third distance range can be set farther away near the attenuation factor of 0%, and the second distance range can be set therebetween.

Referring to FIG. 5 as an example, the first distance range corresponds to one of the distance ranges DRA and DRC, and the first distance resolution corresponds to one of the distance resolutions Δd=1.5 and Δd=2. The third distance range corresponds to the other of the distance ranges DRA and DRC, and the third distance resolution corresponds to the other of the distance resolutions Δd=1.5 and Δd=2. The second distance range corresponds to the distance range DRB, and the second distance resolution corresponds to the distance resolution Δd=1 in the distance range DRB.

In the embodiment, at least one of the first distance resolution and the second distance resolution is variable. One or more of the first distance resolution, the second distance resolution, and the third distance resolution may be variable.

According to the embodiment, it is possible to set an appropriate distance resolution with which calculation accuracy of the attenuation factor is improved whereas the storage capacity is reduced according to a characteristic of the attenuation factor distribution, that is, according to the slope of the attenuation factor distribution in each distance range.

In the embodiment, at least one of the first distance range and the second distance range is variable. One or more of the first distance range, the second distance range, and the third distance range may be variable.

According to the embodiment, it is possible to set an appropriate distance range where the calculation accuracy of the attenuation factor is improved whereas the storage capacity is reduced according to the characteristic of the attenuation factor distribution, that is, a shape of the attenuation factor distribution.

In the embodiment, the look-up table LUT includes the first look-up table LUT1 in which the distance information is stored in each index of the plurality of indexes, and the second look-up table LUT2 in which the attenuation factor information is stored in each of the indexes.

According to the embodiment, the distance information stored in the first look-up table LUT1 is associated with the attenuation factor information stored in the second look-up table LUT2 via the index. Accordingly, the look-up table LUT that outputs the attenuation factor information corresponding to the distance information is implemented.

In the embodiment, the illumination luminance calculation circuit 150 selects an index corresponding to the distance information indicating the distance between the target pixel and each light source element from the plurality of indexes in the first look-up table LUT1. The illumination luminance calculation circuit 150 reads the attenuation factor information stored in the selected index from the second look-up table LUT2. The illumination luminance calculation circuit 150 calculates the illumination luminance information using the read attenuation factor information.

According to the embodiment, the illumination luminance calculation circuit 150 can acquire the attenuation factor distribution corresponding to the distance information indicating the distance between the target pixel and each light source element by referring to the first look-up table LUT1 and the second look-up table LUT2, and can calculate the illumination luminance information using the attenuation factor information.

In the embodiment, the illumination luminance calculation circuit 150 selects the first index and the second index from the plurality of indexes in the first look-up table LUT1 based on the distance information. The illumination luminance calculation circuit 150 reads the first attenuation factor information stored in the first index and the second attenuation factor information stored in the second index from the second look-up table LUT2. The illumination luminance calculation circuit 150 obtains the attenuation factor corresponding information to the distance information by interpolating the first attenuation factor information and the second attenuation factor information, and calculates the illumination luminance information using the obtained attenuation factor information.

According to the embodiment, the attenuation factor can be more accurately interpolated in a distance range in which the distance resolution of the look-up table LUT is high. Accordingly, since the distance resolution is high in the second distance range in which the slope of the attenuation factor distribution is relatively large, the illumination luminance calculation circuit 150 can obtain the attenuation factor with high accuracy, and accordingly, the accuracy of the illumination luminance information can be improved.

In the embodiment, the first look-up table LUT1 may store the square of the distance between the light source element and the pixel as the distance information.

When a distance in the horizontal scanning direction of the display panel is an x distance and a distance in the vertical scanning direction of the display panel is a y distance, $(\text{distance})^2=(\text{x distance})^2+(\text{y distance})^2$. That is, since the square of the distance is stored in the first look-up table LUT1, it is possible to use the square root of $(\text{x distance})^2+(\text{y distance})^2$ directly as the input to the look-up table LUT without calculation.

In the embodiment, the first look-up table LUT1 may store x distance information indicating the distance in the horizontal scanning direction and y distance information indicating the distance in the vertical scanning direction in each index. In the second look-up table LUT2, attenuation factor information corresponding to the x distance information and the y distance information may be stored in each index.

According to the embodiment, the illumination luminance calculation circuit 150 can obtain the attenuation factor using the two-dimensional look-up table LUT. Since the two-dimensional look-up table LUT can express an attenuation factor distribution that is not rotationally symmetric, even when the attenuation factor distribution of the light source element is not rotationally symmetric, a more accurate attenuation factor is required.

In the embodiment, the storage unit 170 stores the look-up table LUT indicating the attenuation factor distribution in one quadrant when the illumination area of the light source element is divided into the first to fourth quadrants or in an area obtained by dividing one quadrant.

According to the embodiment, the storage capacity of the look-up table LUT can be reduced as compared with a case where the look-up table LUT is created for all of the first to fourth quadrants. For example, when the attenuation factor distribution is targeted in each quadrant, it is sufficient to create the look-up table LUT in one quadrant. Alternatively, when the attenuation factor distribution is targeted in each area obtained by further dividing one quadrant, it is sufficient to create the look-up table LUT in the divided area.

In the embodiment, the display apparatus 200 may be a head-up display, a meter panel, a center information display, or an electronic mirror.

A head-up display, a meter panel, a center information display, or an electronic mirror is mounted on a moving body such as an automobile. Therefore, the environment changes along with a movement of the moving body or a change in time, and various display contents are displayed along with provision of information to the user. Depending on the environment or the display contents, an artifact may be seen due to an error between illumination luminance calculated from the look-up table and actual illumination luminance. According to the embodiment, since the look-up table is created with the distance resolution corresponding to the slope of the attenuation factor distribution, it is possible to reduce the above error to reduce the artifact and to save the storage capacity of the look-up table.

Although the embodiment has been described in detail above, it can be easily understood by those skilled in the art that many modifications are possible without substantially departing from the novel matters and effects of the present disclosure. Accordingly, all such modifications are within the scope of the present disclosure. For example, a term described at least once together with a different term having a broader meaning or the same meaning in the description or the drawings can be replaced with the different term at any place in the description or the drawings. All combinations of the embodiment and the modifications are also within the scope of the present disclosure. The configurations and operations of the circuit apparatus, the backlight, the display apparatus, the display system, the processing apparatus, the electronic device, and the like are not limited to those described in the embodiment, and various modifications are possible.

What is claimed is:

1. A circuit apparatus that controls a display apparatus including a plurality of light source elements and a display panel, the circuit apparatus comprising:

a memory configured to store a look-up table and a program, the look-up table including:

attenuation factor information indicating an attenuation factor distribution of light with respect to a distance between each of the plurality of light source elements and a pixel; and a processor configured to execute the program so as to:

read the attenuation factor information from the look-up table; and calculate, based on the attenuation factor information and light source luminance information indicating luminance of light emitted by each light source element of the plurality of light source elements, illumination luminance information indicating luminance at which a target pixel of the display panel is illuminated by the plurality of light source elements; and perform color correction on input image data based on the illumination luminance information, wherein the processor is further configured to read the attenuation factor information with a first distance resolution in a first distance range and read the attenuation factor information with a second distance resolution in a second distance range, the second distance resolution is higher than the first distance resolution, and a slope of the attenuation factor distribution in the second distance range is larger than a slope of the attenuation factor distribution in the first distance range.

2. The circuit apparatus according to claim 1, wherein the processor is further configured to read the attenuation factor information with a third distance resolution lower than the second distance resolution in a third distance range, and a slope of the attenuation factor distribution in the third distance range is smaller than the slope of the attenuation factor distribution in the second distance range, and the second distance range is between the first distance range and the third distance range.

3. The circuit apparatus according to claim 1, wherein at least one of the first distance resolution and the second distance resolution is variable.

4. The circuit apparatus according to claim 1, wherein at least one of the first distance range and the second distance range is variable.

5. The circuit apparatus according to claim 1, wherein the look-up table includes:

a first look-up table in which distance information is stored in each index of a plurality of indexes; and a second look-up table in which the attenuation factor information is stored in each of the plurality of indexes.

6. The circuit apparatus according to claim 5, wherein the processor is further configured to:

select, from the plurality of indexes in the first look-up table, an index corresponding to the distance information indicating a distance between the target pixel and each of the plurality of light source elements;

read the attenuation factor information stored in the selected index from the second look-up table; and calculate the illumination luminance information using the read attenuation factor information.

7. The circuit apparatus according to claim 6, wherein the processor is further configured to:

select, based on the distance information, a first index and a second index from the plurality of indexes in the first look-up table;

read, from the second look-up table, first attenuation factor information stored in the first index and second attenuation factor information stored in the second index;

obtain attenuation factor information corresponding to the distance information by interpolating the first attenuation factor information and the second attenuation factor information; and calculate the illumination luminance information using the obtained attenuation factor information.

8. The circuit apparatus according to claim 5, wherein the first look-up table stores a square of the distance between a light source element of the plurality of light source elements and the pixel as the distance information.

9. The circuit apparatus according to claim 5, wherein the first look-up table stores, in each index of the plurality of indexes, x distance information indicating a distance in a horizontal scanning direction and y distance information indicating a distance in a vertical scanning direction, and the second look-up table stores, in each index of the plurality of indexes, the attenuation factor information corresponding to the x distance information and the y distance information.

10. The circuit apparatus according to claim 9, wherein the look-up table indicates the attenuation factor distribution in one quadrant obtained by dividing an illumination area of a light source element of the plurality of light source elements into first to fourth quadrants or in an area obtained by dividing the one quadrant.

11. The circuit apparatus according to claim 1, wherein the display apparatus is a head-up display, a meter panel, a center information display, or an electronic mirror.

12. A display system comprising:

the circuit apparatus according to claim 1; and the display apparatus.

13. A circuit apparatus that controls a display apparatus including a plurality of light source elements and a display panel, the circuit apparatus comprising:

a memory configured to store a look-up table and a program, the look-up table including:

attenuation factor information indicating an attenuation factor distribution of light with respect to a plurality of distances between each of the plurality of light source elements and a pixel, the attenuation factor distribution including a plurality of attenuation factors grouped in a plurality of indexes; and distance information indicating the plurality of distances grouped in the plurality of indexes; and a processor configured to execute the program so as to:

select a first index of the plurality of indexes corresponding to the distance information indicating a first distance of the plurality of distances between a target pixel and each of the plurality of light source elements;

read the attenuation factor information stored in the first index from the look-up table; and calculate, based on the attenuation factor information stored in the first index and light source luminance information indicating luminance of light emitted by each light source element of the plurality of light source elements, illumination luminance information indicating luminance at which the target pixel of the display panel is illuminated by the plurality of light source elements; and perform color correction on input image data based on the illumination luminance information, wherein the processor is further configured to read the attenuation factor information with a first distance resolution in a first distance range and read the attenuation factor information with a second distance resolution in a second distance range, the second distance resolution is higher than the first distance resolution, and a slope of the attenuation factor distribution in the second distance range is larger than a slope of the attenuation factor distribution in the first distance range.

* * * * *